Figure 3:
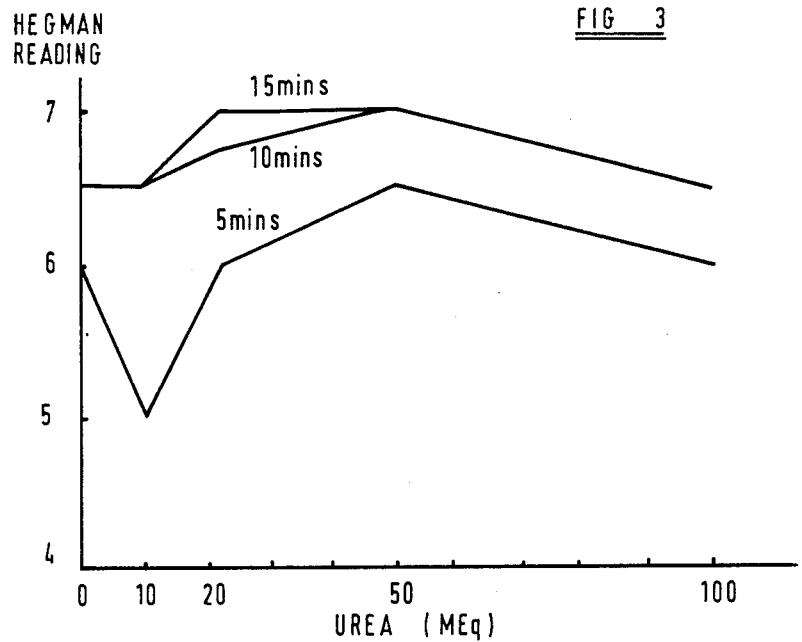

United States Patent [19]

Tatum et al.

[11] Patent Number: 4,752,342
[45] Date of Patent: Jun. 21, 1988

[54] ORGANOCLAY MATERIALS

[75] Inventors: John P. Tatum; Robert C. Wright, both of Essex, United Kingdom

[73] Assignee: Perchem Limited, United Kingdom

[21] Appl. No.: 81,566

[22] Filed: Aug. 3, 1987

Related U.S. Application Data

[63] Continuation of Ser. No. 756,495, filed as PCT GB84/00380, Nov. 5, 1984, published as WO85/01946, May 9, 1985, abandoned.

[30] Foreign Application Priority Data

Nov. 5, 1983 [GB] United Kingdom ............... 8329604
Sep. 11, 1984 [GB] United Kingdom ............... 8422854

[51] Int. Cl.$^4$ ............................................. C04B 14/00
[52] U.S. Cl. ................................. 106/309; 106/308 N; 241/16; 252/8.8
[58] Field of Search ............. 106/308 N, 309; 241/16; 252/8.8, 8.9

[56] References Cited

U.S. PATENT DOCUMENTS

| | | | |
|---|---|---|---|
| 3,936,537 | 2/1976 | Baskerville, Jr. et al. | 252/8.8 |
| 4,292,035 | 9/1981 | Battrell | 252/8.8 |
| 4,308,151 | 12/1981 | Cambre | 252/8.8 |
| 4,374,203 | 2/1983 | Thompson et al. | 106/308 N |
| 4,473,407 | 9/1984 | Thompson, III et al. | 106/308 N |
| 4,569,923 | 2/1986 | Knudson, Jr. et al. | 106/308 N |

FOREIGN PATENT DOCUMENTS 99538 12/1978 Poland .
2107693 5/1983 United Kingdom .

Primary Examiner—A. Lionel Clingman
Assistant Examiner—Willie J. Thompson
Attorney, Agent, or Firm—Vaden, Eickenroht, Thompson & Boulware

[57] ABSTRACT

Organoclay materials formed by reacting smectite clays with a quaternary ammonium compound are improved by controlling the pH of the reaction mixture, typically to a value in the range 8 to 10, and preferably 9.0±0.5, and by including in the reaction mixture a further substance, such as urea or sulphamic acid, having an unsubstituted or substituted amino or amido group.

22 Claims, 4 Drawing Sheets

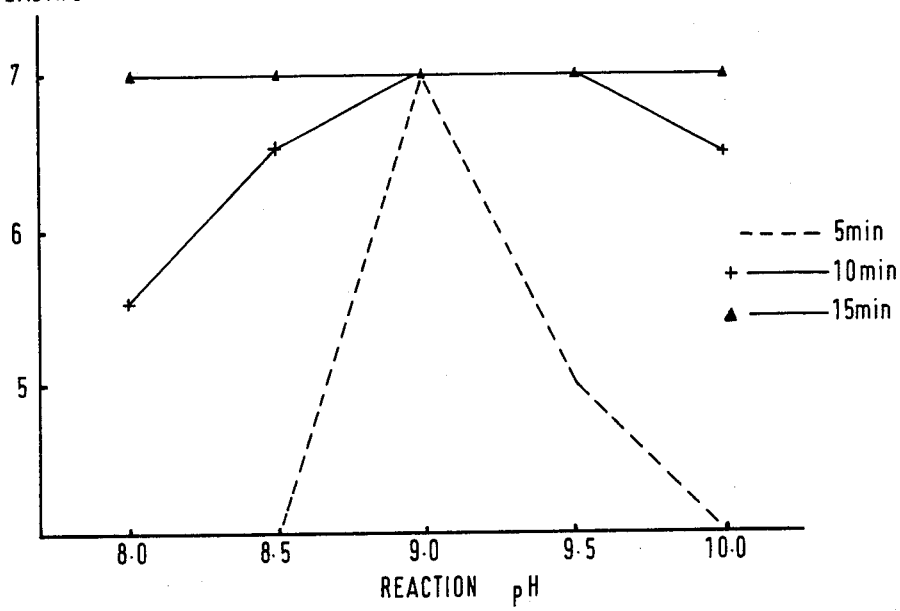
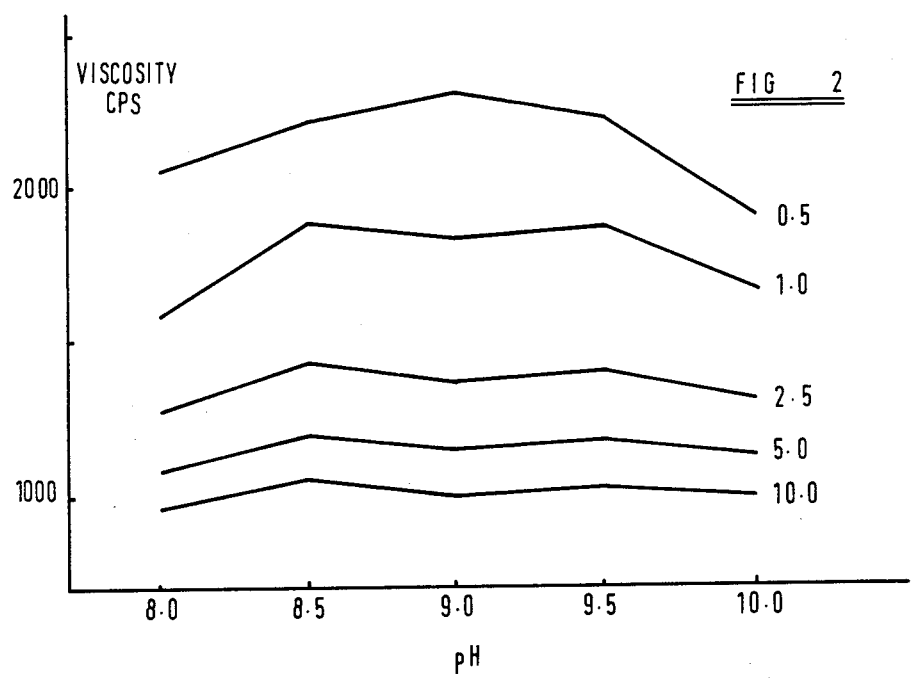

ORGANOCLAY MATERIALS

This application is a continuation, of application Ser. No. 756,495, filed as PCT GB84/00380 on Nov. 5, 1984, published as W085/01946 on May 9, 1985 now abandoned.

This invention relates to organoclay materials, that is to say materials formed by the reaction of a smectite clay, such as bentonite or montmorilonite, with a quaternary ammonium compound. These materials are used for example as additives in the manufacture of paints and other coating compositions for the purpose of providing or modifying thixotropic properties. However, known organoclay materials previously used for this purpose suffer from a number of disadvantages. In particular, some are rather difficult to disperse, and some are more suitable for use with aliphatic systems whereas others are more suitable for use with aromatic systems.

The modified clays which tend to be rather difficult to disperse are typically made by reacting a quaternary ammonium compound with the clay in an amount in the range 90 to 100 milli-equivalents per 100 grams clay (dry weight). The product normally requires grinding into the material to which it is to be added in the same manner as for example a pigment. Alternatively it may be incorporated into a pre-gel in a high-shear mixer. Additionally it is necessary to incorporate a polar compound, such as ethyl alcohol, into the product, but the quantity required in any given system is rather critical and this may cause production problems.

Known types of more readily dispersible organoclays may be made by methods involving the use of larger quantities of the quaternary ammonium compound, e.g. up to about 150 milli-equivalents per 100 grams clay (dry weight) with the clay and an organic anion derived from various organic acids or salts thereof. Whilst, under laboratory conditions it is possible to regulate the quantities of the various reactants to optimize the resulting product, in actual production the variability inherent in naturally occurring clays and also affected by their treatment history means that it is difficult to ensure that a consistent product having optimum properties is obtained.

In none of their prior processes is any attempt made to adjust the pH of the reaction mixture to an optimum value.

It is an object of the present invention to provide an improved method of preparing such organoclay materials and reduce the variable effect on the product due to the differences occurring in commercially available clays.

One effect which we have discovered is that if the pH during the reaction process is controlled and adjusted to an optimum value, the time required to make a satisfactory dispersion of the product when it is subsequently used as an additive can be reduced to a minimum.

Accordingly in accordance with one aspect of the invention, for reaction between a smectite-type clay and a quaternary ammonium compound to form an organoclay material, the pH of the reaction mixture is adjusted to a predetermined value. Typically this value is in the range 8 to 10 and may be achieved by the addition of sodium carbonate or other appropriate substance, such as hydrochloric acid.

If the pH can be accurately adjusted to correspond closely to a critical predetermined optimum value for any given type of clay, e.g. pH 9.0, this in itself may be sufficient to ensure that the product has consistent properties in use. However where, for practical reasons, it is difficult to maintain accurate control of pH, we have discovered that the addition of a further substance including an unsubstituted or substituted amino or amido group reduces the criticality of the pH so that similar results can be achieved with less accurate pH control, e.g. pH $9.0 \pm 0.5$.

Accordingly in accordance with a further aspect of the invention, the reaction between a smectite-type clay and a quaternary ammonium compound to form an organoclay material is carried out in the presence of a further substance including an unsubstituted or substituted amino or amido group.

The further substance may be present in an amount of approximately 1% by weight, typically in the range 0.2% to 5.0%, and preferably in the range 0.4% to 2.0%, e.g. about 20 to 50 milli-equivalents per 100 grams clay (dry weight).

Preferably, the further substance comprises urea. Sulphamic acid may also be used instead of or in combination with urea. Also, substituted ureas may be used. More generally similar substances, having an amino group adjacent to an electrophilic (electron-seeking) group, may be used, including compounds such as benzamide, and n-methyl pyrrolidone.

Also in accordance with the invention, an organoclay material comprises the reaction product of a smectite clay and an aqueous quaternary ammonium compound present in a quantity in the range 90-180 milli-equivalents of said compound per 100 g (dry weight) of said clay, the reaction being carried out at a controlled pH preferably in the range 8 to 10.

Further in accordance with the invention, an organoclay material comprises the reaction product of a smectite clay, a quanternary ammonium compound and a further substance including an unsubstituted or substituted amino or amido group.

Preferably the above methods of preparing an organoclay material include a step wherein the material is dried at a temperature not less than 30° C. and not exceeding 100° C., preferably within the range 50° C. to 80° C., and typically 65° C., in contrast to flash drying techniques currently used which involve high temperatures and adversely affect ease of dispersion.

Not only does a modified organoclay material made in accordance with the invention present improved ease of dispersion, but surprisingly, the same materials can be used in both aliphatic and aromatic systems, and moreover can be useful in some polar systems, i.e. those containing ketones, esters, alcohols and the like, for example in nitrocellulose lacquers.

In a typical example, the basic composition may comprise bentonite clay and an aqueous quaternary compound present in a quantity in the range 90–180 multi-equivalents per 100 g (dry weight) of the clay.

The quaternary ammonium compound employed may be a commercially available product comprising a di-(hydrogenated tallow)dimethyl ammonium chloride, or other suitable quarternary ammonium salts such as dimethylbenzyl(hydrogenated tallow)ammonium chloride.

The pH is adjusted by addition of sodium carbonate or hydrochloric acid, for example, to bring it to a selected value in the range 8 to 10, preferably 9.

These substances may be mixed and reacted in a conventional manner by a wet process, that is to say the reaction is carried out in suspension in water, and the product is then dried. Alternatively, it is possible to mix the solid substances in the presence of a little water. Drying should preferably take place at a temperature of less than 100° C. to avoid degradation of the product. In practice a temperature of about 65° C. appears to be optimum as at lower temperatures the increased residence time in the drier may cause degradation.

The mixture may also include urea in a quantity in the range 20–50 milli-equivalents to further improve the dispersion characteristics of the product. Sulphamic acid and mixtures of urea and sulphamic acid in various ratios have also proved effective for this purpose and it is thought that substituted ureas could also be employed successfully. Other compounds which it is contemplated may be satisfactory would likewise afford an amino group adjacent to an electrohilic group as previously mentioned.

Instead of bentonite, other smectite clays conventionally used for the manufacture of organoclays for use as thixotropic agents, such as hectorite and montmorilonite, or mixtures of such clays could be employed.

The invention will now be illustrated by way of a number of specific examples.

EXAMPLES 1 TO 5

The relationship between the pH of the reaction mixture used in the preparation of an organoclay material and the time required to obtain a satisfactory dispersion of the organoclay material as an additive in a product such as a paint is shown by Examples 1 to 5.

Five organoclays were made in the laboratory using a sodium bentonite of Wyoming origin with the addition of 125 m.Eq., 75% dimethyl di-(hydrogenerated tallow)ammonium chloride (DMDHT) and 25 m.Eq. urea. The pH was adjusted at 60° C. with either hydrochloric acid or sodium carbonate and the reaction with the quaternary compound carried out. All the organoclays were processed in the same way, i.e. by fluid bed drying and sieving.

The organoclays so produced were dispersed in a proprietary white gloss paint at 0.5% w/w and at 2500 rpm using a propellor type stirrer. To determine the degree of dispersion, Hegman grid gauge readings were taken at 5 minute intervals for 15 minutes in the course of the dispersion process. Viscosities were also measured after standing overnight at 25° C. using a Brookfield viscometer with spindle 2.

RESULTS

| | | Dispersion | | |
|---|---|---|---|---|
| | | HEGMAN READING TIME (MINS) | | |
| EXAMPLE | PH | 5 | 10 | 15 |
| 1 | 8.0 | 4.0 | 5.5 | 7.0 |
| 2 | 8.5 | 4.0 | 6.5 | 7.0 |
| 3 | 9.0 | 7.0 | 7.0 | 7.0 |
| 4 | 9.5 | 5.0 | 7.0 | 7.0 |
| 5 | 10.0 | 4.0 | 6.5 | 7.0 |

| | | Viscosity | | | | |
|---|---|---|---|---|---|---|
| | | VISCOSITY CPS SPEED/TIME | | | | |
| EXAMPLE | PH | 0.5/ 4 MIN | 1.0/ 2 MIN | 2.5/ 48 SEC | 5.0/ 24 SEC | 10.0 12 SEC |
| 1 | 8.0 | 2080 | 1600 | 1296 | 1088 | 964 |
| 2 | 8.5 | 2240 | 1880 | 1440 | 1208 | 1056 |
| 3 | 9.0 | 2320 | 1840 | 1376 | 1152 | 966 |
| 4 | 9.5 | 2240 | 1880 | 1408 | 1184 | 1028 |
| 5 | 10.0 | 1920 | 1680 | 1328 | 1136 | 1000 |

These results are illustrated in FIGS. 1 and 2. As can clearly be seen from FIG. 1, at all values of pH tested a dispersion corresponding to a Hegman value of 7 was obtained after 15 minutes stirring. After 10 minutes of stirring values in the range 6.5 to 7 were obtained for pH values in the range 8.5 to 10, with the peak value of 7 at pH values 9.0 to 9.5. However after only 5 minutes stirring the peak Hegman value of 7 was obtained only at Ph 9.0.

Accordingly, by adjusting the pH value at which the reaction is carried out as closely as possible to the optimum value, in this case 9.0, the time required for dispersion of the organoclay material when it is incorporated into a paint by the paint manufacturer can be minimised, that is in this case reduced to approximately 5 minutes for the quantities tested.

If very accurate control of pH is not practicable on a commercial scale, adjustment to a value falling within a predetermined range, in this case 8.5 to 10.0, will enable a satisfactory dispersion to be achieved in a time somewhat longer than the minimum, that is in this case 10 minutes for the quantities tested, but significantly less than the time which would be needed to ensure satisfactory dispersion in the absence of pH control during the manufacture of the organoclay material.

EXAMPLE 6 TO 10

The effect of varying the urea content of the reaction mixture is shown by Examples 6 to 10.

Using 125 m.Eq. DMDHT and adjusting the pH to 9.0 the level of urea was varied in a series of preparations which were processed and tested as above described in relation to Examples 1 to 5.

RESULTS

| | | Dispersion | | |
|---|---|---|---|---|
| | | HEGMAN READING TIME(MIN) | | |
| EXAMPLE | UREA M.EQ. | 5 | 10 | 15 |
| 6 | 0.0 | 6.0 | 6.5 | 6.5 |
| 7 | 10.0 | 5.0 | 6.5 | 6.5 |
| 8 | 22.5 | 6.0 | 6.5/7 | 7.0 |
| 9 | 50.0 | 6.5 | 7.0 | 7.0 |
| 10 | 100.0 | 6.0 | 6.0 | 6.5 |

| | | Viscosity | | | | |
|---|---|---|---|---|---|---|
| | | VISCOSITY CPS SPEED/TIME | | | | |
| EXAMPLE | UREA M.EQ. | 0.5/ 4 MIN | 1.0/ 2 MIN | 2.5/ 48 SEC | 5.0/ 24 SEC | 10.0/ 12 SEC |
| 6 | 0.0 | 1600 | 1440 | 1200 | 1080 | 980 |
| 7 | 10.0 | 1680 | 1440 | 1232 | 1064 | 944 |
| 8 | 22.5 | 1600 | 1400 | 1168 | 1032 | 924 |
| 9 | 50.0 | 1520 | 1360 | 1152 | 1016 | 916 |

-continued

| | Viscosity | | | | | |
|---|---|---|---|---|---|---|
| | | VISCOSITY CPS SPEED/TIME | | | | |
| EXAMPLE | UREA M.EQ. | 0.5/ 4 MIN | 1.0/ 2 MIN | 2.5/ 48 SEC | 5.0/ 24 SEC | 10.0/ 12 SEC |
| 10 | 100.0 | 1280 | 1160 | 1024 | 920 | 832 |

Figure 4:
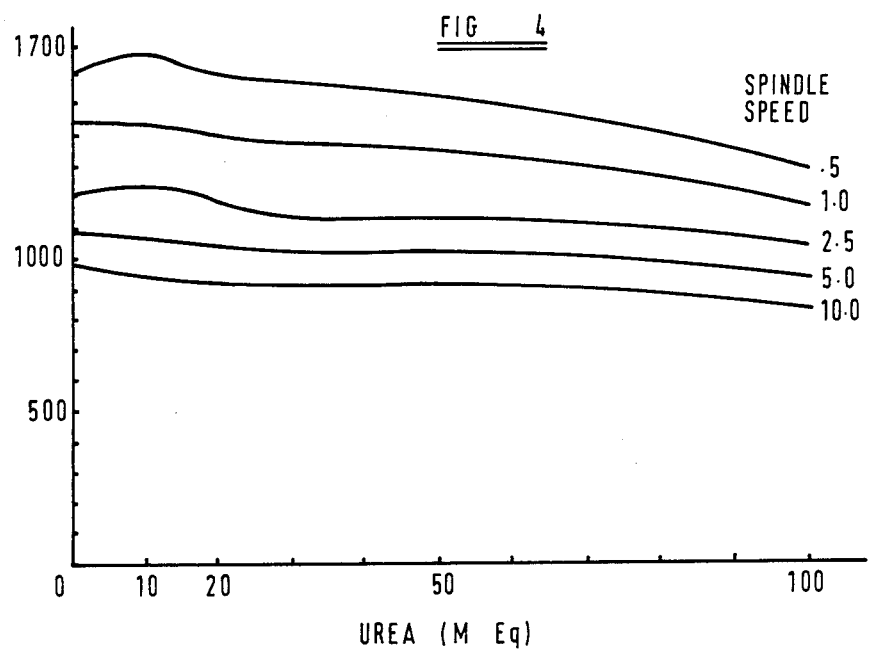

These results are illustrated in FIGS. 3 and 4 and as can be seen from FIG. 3, optimum results at pH 9.0 in this case are achieved over a range of about 20 to 100 milli-equivalents, with the peak at about 50.

EXAMPLES 11 TO 13

The effect of varying the pH of the reaction in the absence of urea in the reaction mixture is illustrated in Examples 11 to 13.

The procedure specified in Examples 1 to 5 was carried out with the omission of urea from the reaction mixture, but utilizing a bentonite (montorillonite) clay.

RESULTS

| | Dispersion | | | |
|---|---|---|---|---|
| | | HEGMAN READING TIME(MINS) | | |
| EXAMPLE | pH | 5 | 10 | 15 |
| 11 | 8.0 | 4 | 5 | 6 |
| 12 | 9.0 | 5 | 6 | 7 |
| 13 | 10.0 | 4 | 5 | 7 |

Figure 5:
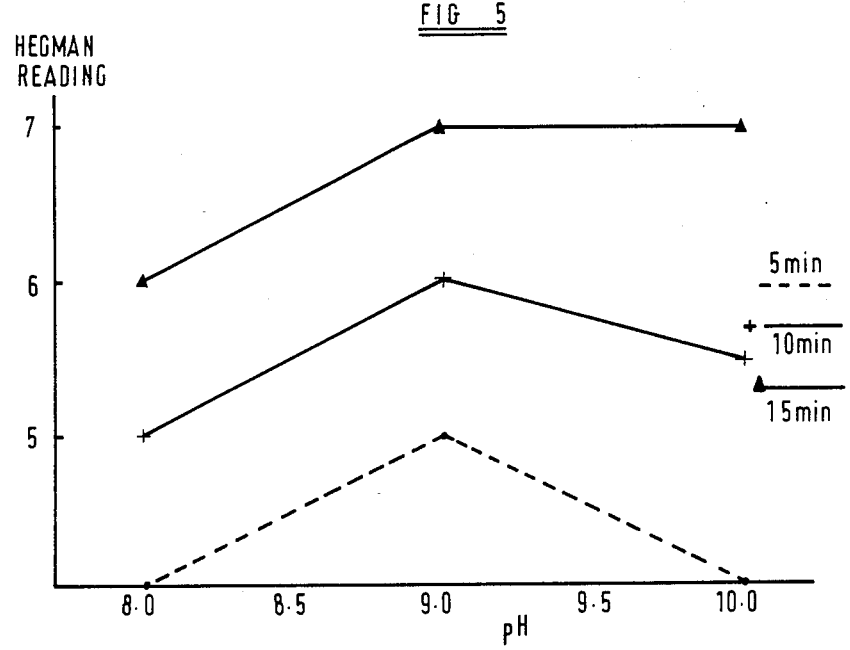

The results are illustrated in FIG. 5 from which it can be seen by comparison with FIG. 1 that in the absence of urea less satisfactory dispersion is achieved.

EXAMPLES 14 TO 18

The effect of variation of urea content was investigated further with an alternative clay. The procedures of Examples 6 to 10 were repeated using a calcium montmoritonite of Greek origin with 130 m.Eq. of di(-hydrogenated tallow)di methyl ammonium chloride and urea content respectively 0, 15, 30, 50 and 100 m.Eq.

Figure 6:
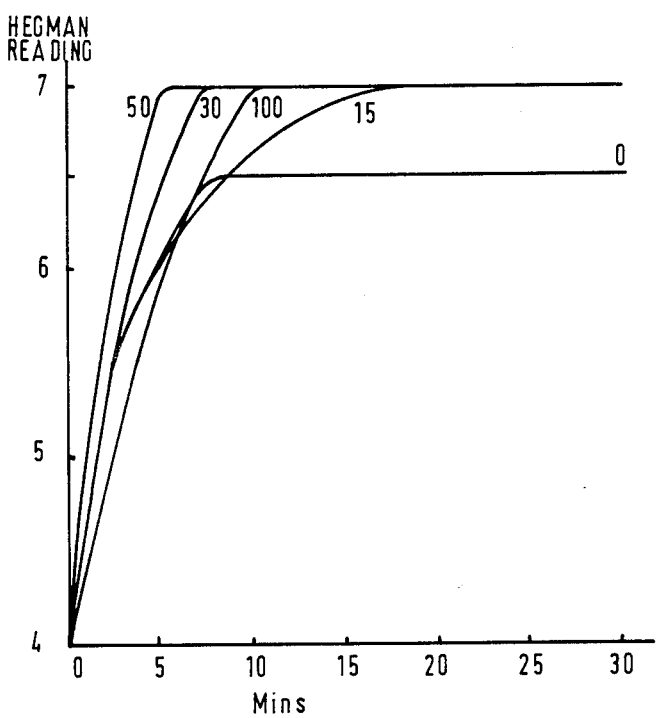

The results are illustrated in FIG. 6 which shows that in this case also, at pH 9.0 the optimum Hegman reading of 7 is obtained after a dispersion time which reaches a minimum of 5 minutes for a urea concentration of 50 m.Eq., whilst the same Hegman reading is attained after 7.5 to 10 minutes dispersion time for concentrations in the range 30 to 100 m.Eq.

EXAMPLES 19 TO 23

To illustrate the suitability of amino compounds and amido compounds other than urea, a bentonite clay as used in Examples 11 to 13 was reacted in the manner described in relation to Examples 1 to 5 at pH 9.0 with 25 m.Eq. of the various additives set out in the following table.

| | | HEGMAN READING TIME(MINS) | | | |
|---|---|---|---|---|---|
| EXAMPLE | ADDITIVE | 5 | 10 | 15 | 30 |
| 19 (Control) | NONE | 4 | 45 | 6 | — |
| 20 | n-methyl pyrrolidone | 5 | 7 | 7 | |
| 21 | benzamide | 4 | 5 | 7 | 7 |
| | | 4 | 5 | 6.5 | 7 |
| 22 | urea | 4.5 | 5.5 | 7 | — |
| 23* | pyridine | 4 | 4 | 4 | 4 |

*for comparison

As can be seen urea, n-methyl pyrrolidone, and benzamide, which all afford an unsubstituted or substituted amino or amido group adjacent to an electrophyllic carbonyl group give rise to an improvement in the required dispersion time. Tests with sulphamic acid, in which an amide group is adjacent to an electrophyllic $SO_2$ group have also shown similar results. However, in the case of pyridine, in which the N atom is part of an aromatic ring, no such improvement was observed.

EXAMPLES 24 TO 38

To show the utility of organoclays produced in accordance with the invention in aliphatic, aromatic and polar systems, Examples 24 to 38 are presented.

In the following Examples organoclays in accordance with the invention are used as additives for modifying the rheological properties of three different systems, and for comparison the same systems have been tested with a conventional organoclay and without any additive.

| | Alphatic System:Alkyd Undercoat Formulation | | | | |
|---|---|---|---|---|---|
| | EXAMPLE NO. | | | | |
| Ingredient | 24 | 25 | 26 | 27 | 28 |
| Basic System- | | | | | |
| Titanium Dioxide | 24.00 | 24.00 | 24.00 | 24.00 | 24.00 |
| Barytes | 17.50 | 17.50 | 17.50 | 17.50 | 17.50 |
| China Clay | 7.50 | 7.00 | 5.50 | 7.00 | 5.50 |
| Whiting | 20.00 | 20.00 | 20.00 | 20.00 | 20.00 |
| 53% Solids L.O. Alkyd | 10.00 | 10.00 | 10.00 | 10.00 | 10.00 |
| Linseed Stand Oil 40 p | 4.50 | 4.50 | 4.50 | 4.50 | 4.50 |
| 6% Cobalt Octotate | 0.10 | 0.10 | 0.10 | 0.10 | 0.10 |
| 24% Lead Naphthenate | 0.25 | 0.25 | 0.25 | 0.25 | 0.25 |
| Methyl Ethyl Ketoxime | 0.05 | 0.05 | 0.05 | 0.05 | 0.05 |
| Propylene Carbonate | — | — | — | 0.25 | 1.00 |
| White Spirit | 16.10 | 16.10 | 16.10 | 16.10 | 16.10 |
| Additive | | | | | |
| Organoclay | NIL | 0.50 | 2.00 | 0.50 | 2.00 |
| Total | 100.00 | 100.00 | 100.00 | 100.00 | 100.00 |

The organoclay used in Examples 25 and 26 is made in accordance with the invention substantially as described in Example 3, except that the quantity of DMDHT is raised to 135 m.Eq. and the pH is adjusted to 9±0.5 whilst that used in Examples 27 and 28 is a commercially available product comprising a Bentonite reacted with 96 m.Eq. DMDHT

Dispersion Performance

Incorporation of 2% organoclay into the basic system was carried out by a 3 bladed propellor at 2000 rpm, and Hegman readings for dispersion were taken at intervals over a period of 30 minutes with the following results.

| | Hegman Reading | | | | |
|---|---|---|---|---|---|
| Example | 5 Mins | 10 Mins | 15 Mins | 20 Mins | 30 Mins |
| 24 | 6.5 | 6.5 | 6.5 | 6.5 | 6.5 |
| 26 | 4.0 | 5.0 | 6.0 | 6.5 | 6.5 |
| 38 | 4.0 | 4.0 | 4.0 | 4.5 | 4.5 |

Figure 7:
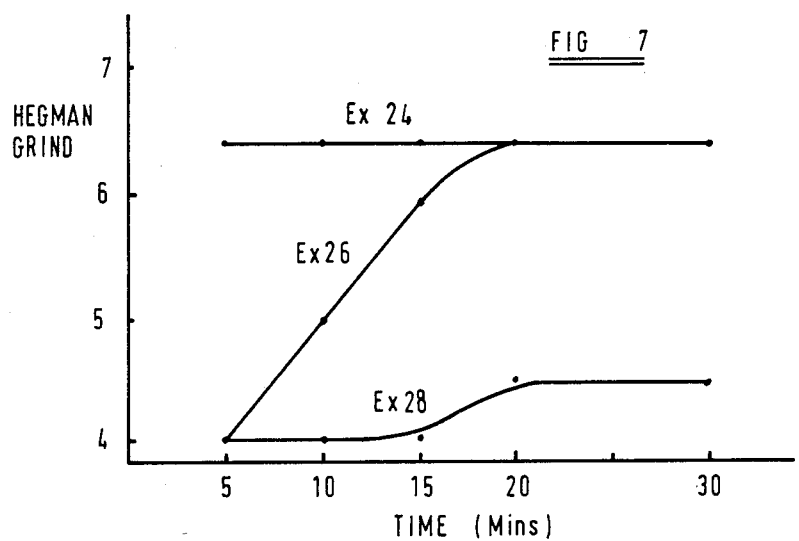

These results are illustrated in FIG. 7 from which it can clearly be seen that the organoclay produced in accordance with the invention is more readily incorporated into the system.

| | Settlement Performance | | |
|---|---|---|---|
| Incorporation | Into mill base | | |
| Organoclay Level | 0.5% | | |
| Example | One Month | Three Months | Six Months |
| | Settlement Performance | | |
| 24 | Slight settlement | Moderate settlement stirs in | Significant settlement stirs in with difficulty |
| 25 | No settlement | No settlement | Very slight settlement stirs in |
| 27 | No settlement | No settlement | Very slight settlement stirs in |

| | Viscosity | | | | |
|---|---|---|---|---|---|
| Incorporation | Organoclay according to invention, as dry powder (Cowels disperser 1500 rpm); commercial organoclay, as pre-gel in white spirit. | | | | |
| Organoclay Level | 0.5% | | | | |
| Viscosity Measurement | Brookfield RVT, spindle 6 | | | | |
| | Shear speed | | | | |
| | 0.5 | 1.0 | 2.5 | 5.0 | 10.0 |
| Example | 4 min | 2 min | 48 sec | 24 sec | 12 sec |
| | Viscosity (Pas) | | | | |
| 24 | 500 | 450 | 320 | 232 | 169 |
| 25 | 2300 | 1450 | 828 | 542 | 358 |
| 27 | 1800 | 1350 | 770 | 520 | 345 |

Figure 8:
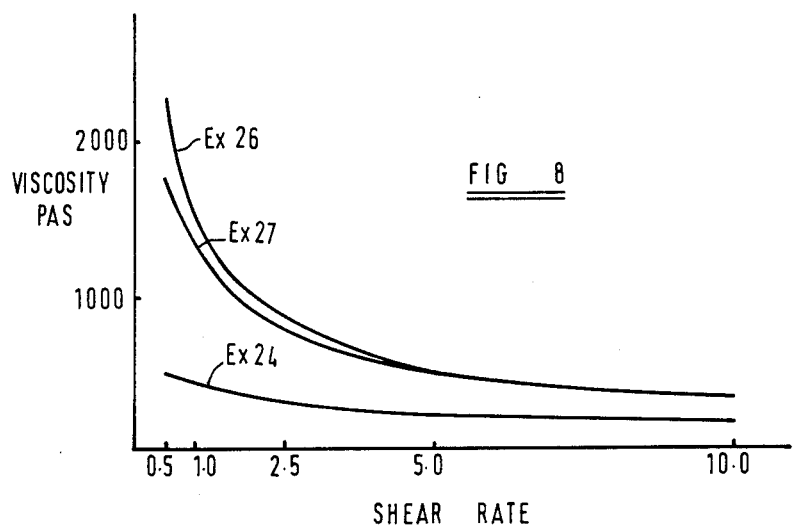

These results are illustrated in FIG. 8 from which it can be seen that in respect of the viscosity of the final product, the organoclay additive according to the invention does not differ significantly from the known additive.

AROMATIC SYSTEM

High Build Chlorinated Rubber Paint

| | Formulation | | | | |
|---|---|---|---|---|---|
| | Example No. | | | | |
| Ingredient | 29 | 30 | 31 | 32 | 33 |
| Basic System- | | | | | |
| Low Viscosity Chlorinated Rubber | 12.8 | 12.5 | 11.8 | 12.5 | 11.8 |
| Solid Chlorinated Paraffin | 7.5 | 7.4 | 6.9 | 7.4 | 6.9 |
| Liquid Chlorinated Paraffin | 4.3 | 4.2 | 3.9 | 4.2 | 3.9 |
| Titanium Dioxide | 14.0 | 14.0 | 14.0 | 14.0 | 14.0 |
| Barytes | 14.0 | 14.0 | 14.0 | 14.0 | 14.0 |
| Vegetable Black | 0.2 | 0.2 | 0.2 | 0.2 | 0.2 |
| Propylene Carbonate | — | — | — | 0.25 | 1.0 |
| Xylene | 38.0 | 38.0 | 38.0 | 38.0 | 38.0 |
| Cellosolve | 9.2 | 9.2 | 9.2 | 8.95 | 8.2 |
| Additive- | | | | | |
| Organoclay | Nil | 0.5 | 2.0 | 0.5 | 2.0 |

-continued

The organoclay used in Examples 30 and 31 is the same as in Examples 25 and 26. The additive used in Examples 32 and 33 is a commercially available composition formulated for use in aromatic systems and comprising an Hectorite clay (a magnetic silicate type of Smectite clay) reacted with 98 m.Eq dimethyl di(hydrogenated tallow)ammonium chloride.

| | Dispersion Performance | | | | |
|---|---|---|---|---|---|
| Incorporation | 3 bladed, 5 cm diameter propellor at 2000 rpm | | | | |
| Organoclay Level | 2% | | | | |
| | 5 | 10 | 15 | 20 | 30 |
| Example | Mins | Mins | Mins | Mins | Mins |
| | Hegmann Reading | | | | |
| 29 | 7.0 | 7.0 | 7.0 | 7.0 | 7.0 |
| 31 | 4.5 | 5.0 | 6.0 | 7.0 | 7.0 |
| 33 | 4.0 | 4.0 | 4.0 | 4.0 | |

The superiority of Example 31 is apparent.

| | Settlement Performance | | |
|---|---|---|---|
| Incorporation | organoclay according to the invention, added to finished paint system dry; commercial organoclay, added as a pregel in xylene. | | |
| Organoclay Level | 0.5% | | |
| Example | One Month | Three Months | Six Months |
| | Settlement Performance | | |
| 29 | Very slight | Slight stirs in | Moderate stirs in |
| 30 | None | Very slight stirs in easily | Very slight stirs in easily |
| 32 | None | None | Very slight stirs in easily |

| | Sag Resistance | | | |
|---|---|---|---|---|
| Incorporation | organoclay according to the invention, added to finished paint system dry; commercial organoclay, added as pre-gel in xylene | | | |
| Organoclay Level | 1% | | | |
| Example | 125 μm | 150 μm | 175 μm | 200 μm |
| | Sag Performance | | | |
| 29 | No sag | Slight sag | Sags | Sags badly |
| 30 | No sag | No sag | No sag | No sag |
| 32 | No sag | No sag | No sag | No sag |

POLAR SYSTEM

Two Pack Epoxy Primer

| | Formulation | | | | |
|---|---|---|---|---|---|
| | Example No. | | | | |
| Ingredient | 34 | 35 | 36 | 37 | 38 |
| | Pack A | | | | |
| Basic System- | | | | | |
| Zinc Phosphate | 36.0 | 36.0 | 36.0 | 36.0 | 36.0 |
| Titanium Dioxide | 7.7 | 7.7 | 7.7 | 7.7 | 7.7 |
| Talc | 6.0 | 5.5 | 4.0 | 5.5 | 4.0 |
| Epoxy Resin | 16.0 | 16.0 | 16.0 | 16.0 | 16.0 |

-continued

| | Formulation Example No. | | | | |
|---|---|---|---|---|---|
| Ingredient | 34 | 35 | 36 | 37 | 38 |
| Xylene | 5.0 | 5.0 | 5.0 | 5.0 | 5.0 |
| Toluene | 7.8 | 7.8 | 7.8 | 7.8 | 7.8 |
| Isopropanol | 9.9 | 9.5 | 9.5 | 9.5 | 9.5 |
| Propylene Carbonate Additive- | — | — | — | 0.25 | 1.0 |
| Organoclay | — | 0.5 | 2.0 | 0.5 | 2.0 |
| Pack B | | | | | |
| Polyamide | 8.5 | 8.5 | 8.5 | 8.5 | 8.5 |
| Isopropanol | 1.8 | 1.8 | 1.8 | 1.8 | 1.8 |
| Toluene | 1.7 | 1.7 | 1.7 | 1.7 | 1.7 |

The organoclay used in Examples 35 and 36 is the same as in Examples 25, 26, 29 and 31. The organoclay used in Examples 37 and 38 is a commercially available composition formulated for use in polar systems and comprising a Bentonite clay reacted with 98 m.Eq dimethyl hydrogenated tallow benzyl ammonium chloride.

| | Dispersion Performance | | | | |
|---|---|---|---|---|---|
| Incorporation | As dry powder into Pack A using a 3 bladed propellor stirrer at 2000 rpm | | | | |
| Organoclay | 2% | | | | |
| Example | 5 Mins | 10 Mins | 15 Mins | 20 Mins | 30 Mins |
| | Hegmann Gauge Reading | | | | |
| 34 | 7.0 | 7.0 | 7.0 | 7.0 | 7.0 |
| 36 | 4.0 | 4.0 | 5.0 | 6.0 | 6.5 |
| 38 | 4.0 | 4.0 | 4.0 | 4.0 | 4.0 |

The superiority of the Example 36 is evident.

| | Settlement Performance | | |
|---|---|---|---|
| Incorporation Organoclay | In mill base of Pack A 0.5% | | |
| Example | One Month | Three Months | Six Months |
| | Settlement Performance | | |
| 34 | Settles stirs in | Settles difficult to stir in | Heavy settlement hard to stir in |
| 35 | No settlement | Very slight settlement easy to stir in | Slight settlement easy to stir in |
| 37 | No settlement | Very slight settlement | Slight settlement easy to stir in |

| | Sag Resistance |
|---|---|
| Incorporation | Organoclay according to the invention; stirred in using a 3 bladed propellor stirrer at 2000 rpm; commercial organoclay, ground into mill base |
| Organoclay Level | 1% |

| | Packs A and B mixed and sag test performed | | | |
|---|---|---|---|---|
| Example | 125 μm | 150 μm | 175 μm | 200 μm |
| | Sag Performance | | | |
| 34 | Sags | Sags badly | Curtains | Runs off |
| 35 | No sag | No sag | Slight sag | Sag |
| 37 | No sag | No sag | No sag | Slight sag. |

The above results of Examples 24 to 38 show that while conventional organoclays remain invaluable as viscosifiers for systems which predominantly consist of solvent, for example, greases, an organoclay made in accordance with the invention can, in the majority of common coating formulations, replace a range of conventional organoclay gellants. This in turn means a reduction in stockholding costs and easier formulation, while the easy dispersibility of inventive organoclay enables savings to be made by reducing incorporation times and process energy requirements. In addition, the inventive organoclay is less affected by the components used in coating formulations, more consistent results are readily attainable, thus saving laboratory time and labour.

We claim:

1. A method of preparing an organoclay by the reaction between a smectite-type clay and a quaternary ammonium compound wherein such reaction is carried out in the presence of a further substance comprising an amino group adjacent to an electrophillic (electron-seeking) group.

2. A method of preparing an organoclay by the reaction between a smectite-type clay and a quaternary ammonium compound wherein said reaction is carried out in the presence of urea.

3. A method of preparing an organoclay by the reaction between a smectite-type clay and a quaternary ammonium compound wherein said reaction is carried out in the presence of sulphamic acid.

4. A method of preparing an organoclay material by the reaction of a smectite-type clay and an aqueous quaternary ammonium compound to give a product in which the quaternary compound is present in a quantity in the range 90 to 180 milli-equivalents per 100 grams (dry weight) of the clay characterized in that said reaction further comprises a substance comprising an unsubstituted or substituted amino or amido group adjacent to an electrophilic (electron-seeking) group is carried out at a controlled pH value adjusted to fall substantially at an optimum value within the range 8 to 10.

5. A method according to claim 4 wherein the pH value is adjusted to 9.0±0.5.

6. A method according to claim 4 wherein the pH value is adjusted to 9.0.

7. A method according to claim 4 wherein said further substance is present in an amount in the range 20 to 50 milli-equivalents per 100 grams (dry weight) of the clay.

8. A method according to claim 4 or claim 7 wherein said further substance comprises urea.

9. A method according to claim 4 or claim 7 wherein said further substance comprises sulphamic acid.

10. A method according to any one of the preceding claims wherein said clay comprises a Bentonite clay and said quaternary ammonium compound comprises an hydrogenated tallow ammonium chloride.

11. An organoclay material prepared by a method as claimed in any one of the preceding claims.

12. An organoclay material comprising the reaction product of a smectite clay and an aqueous quaternary ammonium compound present in a quantity in the range 90–180 milli-equivalents of said compound per 100 grams (dry weight) of the clay, characterized by the reaction further comprises a substance comprising an unsubstituted or substituted amino or amido group adjacent to an electrophilic (electron-seeking) group being carried out at a controlled pH value adjusted to fall substantially at an optimum value within the range 8 to 10.

13. A method of preparing an organoclay material by the aqueous reaction of a smectite-type clay and an aqueous quaternary ammonium compound to give a product in which the quaternary compound is present in a quantity in the range 90 to 180 milli-equivalents per 100 grams (dry weight) of the clay characterized in that said reaction is carried out by dispersal of said clay by stirring in an aqueous medium at a controlled pH value adjusted to fall substantially at an optimum value within the pH range 8 to 10, and said optimum value for the clay reaction causing the dispersal time to be reduced to a minimum of stirring time in comparison to pH values other than said optimum value at like clay dispersal conditions.

14. A method according to claim 13 wherein the pH value is adjusted to 9.0±0.5.

15. A method according to claim 13 wherein the pH value is adjusted to 9.0.

16. A method according to claim 13 or claim 14 wherein the reaction mixture includes a further substance comprising an unsubstituted or substituted amino or amido group adjacent to an electrophilic (electron-seeking) group.

17. A method according to claim 16 wherein said further substance is present in an amount in the range 20 to 50 milli-equivalents per 100 grams (dry weight) of the clay.

18. A method according to claim 16 or claim 17 wherein said further substance comprises urea.

19. A method according to claim 16 or claim 17 wherein said further substance comprises sulphamic acid.

20. A method according to any one of the preceding claims wherein said clay comprises a Bentonite clay and said quaternary ammonium compound comprises an hydrogenated tallow ammonium chloride.

21. An organoclay material prepared by a method as claimed in any one of the preceding claims.

22. An organoclay material comprising the aqueous reaction product of a smectite clay and an aqueous quaternary ammonium compound present in a quantity in the range 90–180 milli-equivalents of said compound per 100 grams (dry weight) of the clay, characterized by the reaction being carried out by dispersal of said clay by stirring in an aqueous medium at a controlled pH value adjusted to fall substantially at an optimum value within the range 8 to 10, and said optimum value for the clay reaction causing the dispersal time to be reduced to a minimum time in comparison to pH values other than said optimum value at like clay dispersal conditions.

* * * * *